Patented May 7, 1935

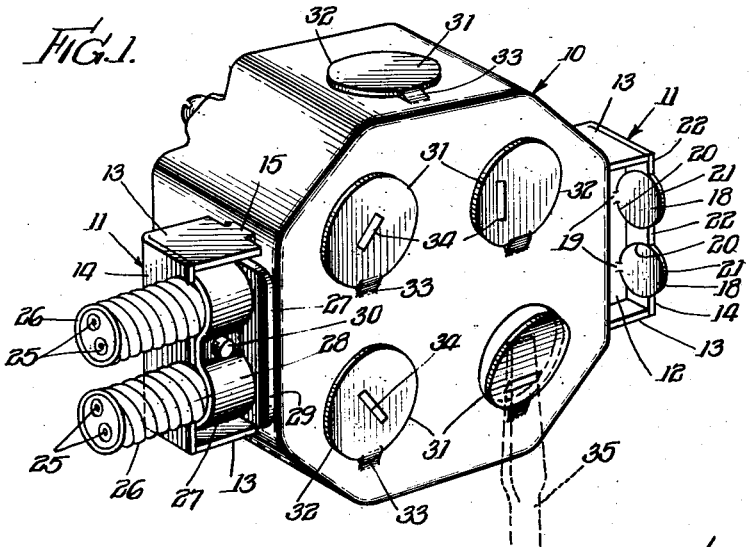

2,000,851

UNITED STATES PATENT OFFICE 2,000,851

OUTLET BOX

John Knell, Aurora, Ill., assignor to All-Steel-Equip Company, Aurora, Ill., a corporation of Illinois Application March 14, 1931, Serial No. 522,553

6 Claims. (Cl. 247—25)

This invention relates to electric receptacles and particularly to outlet boxes.

The primary object of the present invention is to provide a new and improved outlet box which is provided with a rigidly mounted cable receiving member, or housing, which has a movable member for clampingly fastening a conduit or cable to the housing and thus to the box, and which is provided with novel knock-outs on the housing to cover certain openings when a cable is not attached to the box at a certain knock-out.

Another object is to provide an improved outlet box which has new and novel knock-outs, which is provided with simple and efficient means for permitting the knock-outs to be removed by a tool, such as a screw-driver, and which has the knock-outs connected to the body of the box by an integral fin or contact.

A further object is to provide an outlet box having knock-outs, the box being provided with slots therein into which a tool, such as a screw-driver, may be inserted for removing the knock-out from the box.

A further object of the invention is to provide electric protective means, such as an outlet box, with pry-outs, a wall of the box being provided with an opening extending through the thickness of the wall for the reception of a prying tool whereby the pry-out may be pried loose from the wall, the opening in the wall lying outside the boundary of the pry-out.

Other objects and advantages will be apparent throughout the progress of the following specification.

The invention comprises in general an outlet box having a housing rigidly fixed thereto, and a movable member cooperating with the housing for clampingly fastening a conduit or BX cable to the box. The housing has its receiving end covered and has knock-outs provided therein, which, when removed, provide an opening through which the conduit or cable passes.

The accompanying drawing illustrates a selected embodiment of the invention and the views therein are as follows:

Fig. 1 is a detail perspective view of the improved outlet box showing a cable receiving housing attached thereto and showing the manner in which knock-outs on the box and housing may be pried or otherwise removed from the box.

Fig. 2 is a detail plan section, partly in elevation, and on the line 2—2 of Fig. 3.

Fig. 3 is a detail sectional view through the housing on the line 3—3 of Fig. 2.

Fig. 4 is a detail sectional view on the line 4—4 of Fig. 2.

Fig. 5 is a detail plan view of a box showing the knock-out provided with more than one fin.

Fig. 6 is a detail sectional view on the line 6—6 of Fig. 5.

Fig. 7 is a modified form of knock-out.

The particular outlet box herein shown has a body 10 which may be of any conventional shape and which is made of metal as usual. Housings 11 are rigidly fixed to the box, and each housing comprises a top 12, sides 13, 13 and an end 14. The top, end, and sides are preferably stamped from a sheet metal plate and formed to the desired shape and configuration. The top 12 and the sides 13 are provided with outstanding lugs 15 which engage openings 16 in the box body. These lugs extend through the box and are clinched on the inside thereof as indicated at 17 and rigidly connect and fasten the housing 11 to the outlet box.

The end 14 of the housing is provided with one or more knock-outs 18 which are integrally connected to the housing end wall by a contact or fin 19. The knock-outs 18 may be embossed from the housing or entirely separated therefrom along the line 20, as desired, being held in place by a contact or fin 19. The lower edges 21, Fig. 1, of the knock-outs 18 preferably extend below the bottom edge 22 of the housing side 14 to permit them to be engaged by pliers or other tools for breaking them away. Holes or openings 24 are provided in the box and aline with the knock-outs 18 so that when the knock-outs 18 are removed, the openings provided by their removal will coincide with and be directly opposite the holes or openings 24 in the box and permit conductors 25 in the conduits or cables 26 to pass through the housing and into the interior of the box.

A clamping member 27, Figs. 1 and 3, arranged in the housing 11, is preferably made in one piece and provides a bottom for the housing. This clamp has an upper horizontal portion 28 which is dished to accommodate the cables, and a depending portion 29 which engages an end wall of the outlet box. A threaded member 30, Fig. 3, loosely engages the top 12 of the housing and threadedly engages the clamp 27, thus when the threaded member 30 is tightened, the clamp 27 will be pulled upwardly and rigidly fasten the cables 26 to the box.

The housing and its cooperating knock-outs along with the clamp, provide means for supporting the cables and prevent any sparking or flashing inside of the box from passing out of the box. In cases where no cable is inserted, the flashing or sparking is shielded by the end 14 of the housing.

The outlet box is also provided with knock-outs 31 which have a line of rupture 32 made by embossing or cutting. The knock-outs 31 may be raised and parallel with the body of the box, as shown in the various figures, or they may be made normally flush with the surface of the box like the knock-outs 18, Fig. 1. These knock-outs are connected to the body of the outlet box by one or more contacts or fins 33, Figs. 1 and 5, and may have a slot 34 provided in the bodies thereof for the reception of a tool 35 for prying out the knock-outs. These slots may be horizontal, vertical, or diagonal, as shown in Fig. 1.

In Figs. 5 and 6 the slot 36 is inclined through the body of the knock-out so that the full opening through the top, while being as large as the others, presents only a small opening perpendicular to the knock-out. This would cause any flash or spark to make an angle turn before it could discharge from the box. In other words, the spark or flash would be intercepted and in all probability would never find its way out of the box.

While the slots 34 and 36 are shown elongated, it is to be understood that round or square holes may be substituted for the particular slots herein shown.

In Fig. 7 the knock-out 31 is not provided with any slot, but instead an opening 37 is provided in the wall of the box outside of the line of rupture 32 to receive a tool, such as a screw-driver 35, for prying up the knock-out. While the opening 37 may be elongated, as shown, it may be round, square, or any other shape desirable.

The invention provides a box having a novel cable supporting housing, and knock-outs in the box and housing which knock-outs can be readily and easily pried off or otherwise removed from the box.

In applicant's co-pending application, Serial No. 429,493, filed February 19, 1930, an outlet box is shown with an auxiliary housing, but only the particular type of knock-out construction is claimed therein. The features of the outlet box and the auxiliary housing and the particular clamping means are claimed in this application.

Changes may be made in the form, construction, and arrangement of the parts without departing from the spirit of the invention or sacrificing any of the advantages thereof, and the right is hereby reserved to make all such changes as fairly fall within the scope of the following claims.

The invention is hereby claimed as follows:

1. An outlet box comprising a body, a housing located outside of said box and rigidly fixed to an outer wall of said body, said housing when fastened to said wall having an open side, a clamp movably arranged in said housing and closing the said open side, screw means engageable with said clamp and a wall of said housing for clamping a cable in position relative to said box, said outer wall of said box having openings formed therein, and knock-outs in a wall of said housing and in alinement with the openings in said outer wall to receive a cable.

2. An outlet box comprising a body, a housing located outside of said box and rigidly fixed to an outer wall of said body, said housing when fastened to said wall having an open side, a clamp movably arranged in said housing and closing the said open side, screw means engageable with said clamp and a wall of said housing for clamping a cable in position relative to said box, said outer wall of said box having openings formed therein, and knock-outs in a wall of said housing and in alinement with the openings in said outer wall to receive a cable, said knock-outs in said housing being formed at an edge of said housing whereby the knock-outs may be grasped by a tool such as pliers and removed.

3. In a device of the class described comprising a receptacle having openings for the reception of a conduit or cable, an open bottom housing fixed to an outer wall of said receptacle and having knock-outs arranged in an exterior wall thereof in alinement with said openings in the receptacle, a vertically slidable member arranged in the bottom of said housing between the outer wall of the housing and an outer wall of the receptacle, threaded means passing through the top of said housing and engaging said slidable member whereby said slidable member may be moved to clamp a cable or conduit between said member and the outer wall of the housing when a cable is arranged through a knock-out in said housing.

4. In an electric box for an electric receptacle, an exteriorly mounted open bottom housing extending from a side of the receptacle, said receptacle forming one side of the housing, a vertically slidable member arranged in said housing and forming a removable bottom therefor, and a flange integral with said vertically slidable member and engaging a side of the receptacle, and screw means engaging the top of said housing and engaging the vertically slidable member for moving the vertically slidable member toward and away from said top into cable clamping position.

5. An outlet box comprising an exterior open bottom housing arranged adjacent a wall of the box, said wall acting as a side of the housing, the wall of said box acting as a side of the housing having an opening therein, and a knock-out in an exterior wall of said housing in alinement with said opening, whereby the knock-out acts as a closure for the opening in the box, said knock-out when removed providing an opening in alinement with the first opening to permit a cable to extend into the box, and a movable clamping member closing the open bottom of the housing.

6. An outlet box comprising a body, a housing located outside of said box and operatively connected to a wall of the body, the housing when connected to said wall having an open side, a clamp movably arranged in said housing and closing the opening side, means engageable with said clamp and with a wall of said housing for clamping a cable in position relative to the box, said box being constructed and arranged to provide a cable receiving opening, and knock-outs in said housing in alinement with said cable receiving opening.

JOHN KNELL.